(12) United States Patent
Franke et al.

(10) Patent No.: US 10,936,535 B2
(45) Date of Patent: Mar. 2, 2021

(54) PROVIDING REMOTE, RELIANT AND HIGH PERFORMANCE PCI EXPRESS DEVICE IN CLOUD COMPUTING ENVIRONMENTS

(71) Applicant: International Business Machines Corporation, Armonk, NY (US)

(72) Inventors: Hubertus Franke, Cortlandt Manor, NY (US); Davide Pasetto, Mount Kisco, NY (US); Hartmut Penner, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/359,418

(22) Filed: Mar. 20, 2019

(65) Prior Publication Data

US 2019/0220437 A1    Jul. 18, 2019

Related U.S. Application Data

(63) Continuation of application No. 14/598,381, filed on Jan. 16, 2015, now Pat. No. 10,303,644.

(60) Provisional application No. 62/082,909, filed on Nov. 21, 2014.

(51) Int. Cl.
*G06F 15/173* (2006.01)
*H04L 29/08* (2006.01)

(52) U.S. Cl.
CPC .... *G06F 15/17331* (2013.01); *H04L 67/1097* (2013.01)

(58) Field of Classification Search
CPC ......... G06F 15/17331; G06F 15/17325; H04L 67/1097; A61K 31/415; A61K 9/0053

USPC ....................................................... 709/212
See application file for complete search history.

(56) References Cited

U.S. PATENT DOCUMENTS

| 7,929,565 B2 | 4/2011 | Winter |
| 7,934,033 B2 | 4/2011 | Malwankar et al. |
| 7,983,888 B2 | 7/2011 | Evoy et al. |

(Continued)

FOREIGN PATENT DOCUMENTS

WO    WO2013143121 A1    10/2013

OTHER PUBLICATIONS

List of IBM Patents or Patent Applications Treated as Related.

*Primary Examiner* — Moustafa M Meky
*Assistant Examiner* — Kidest Mendaye
(74) *Attorney, Agent, or Firm* — Scully, Scott, Murphy & Presser, P.C.; Vazken Alexanian (57) ABSTRACT

A system architecture, a method, and a computer program product are disclosed for attaching remote physical devices. In one embodiment, the system architecture comprises a compute server and a device server. The compute server includes a system memory, and one or more remote device drivers; and the device server includes a system memory and one or more physical devices, and each of the physical devices includes an associated device memory. The compute server and the device server are connected through an existing network fabric that provides remote direct memory access (RDMA) services. A system mapping function logically connects one or more of the physical devices on the device server to the compute server, including mapping between the system memories and the device memories and keeping the system memories and the device memories in synchronization using the RDMA.

20 Claims, 9 Drawing Sheets

(56) References Cited

U.S. PATENT DOCUMENTS

| | | | |
|---|---|---|---|
| 8,381,204 B2* | 2/2013 | Das | G06F 8/456 717/154 |
| 2006/0075067 A1* | 4/2006 | Blackmore | H04L 69/16 709/217 |
| 2009/0292861 A1* | 11/2009 | Kanevsky | G06F 3/061 711/103 |
| 2012/0131124 A1* | 5/2012 | Frey | G06F 15/16 709/212 |
| 2012/0207165 A1* | 8/2012 | Davis | H04L 45/60 370/392 |
| 2013/0097369 A1* | 4/2013 | Talagala | G06F 12/0804 711/103 |
| 2013/0173837 A1 | 7/2013 | Glaser et al. | |
| 2013/0227201 A1* | 8/2013 | Talagala | G06F 12/0246 711/103 |
| 2013/0346978 A1* | 12/2013 | Jiang | G06F 9/45533 718/1 |
| 2014/0164545 A1* | 6/2014 | Davis | G06F 13/28 709/212 |
| 2014/0173167 A1 | 6/2014 | Choi | |
| 2014/0195711 A1 | 7/2014 | Bhatia et al. | |
| 2014/0201419 A1 | 7/2014 | Ayzenfeld et al. | |
| 2014/0258577 A1 | 9/2014 | Egi et al. | |
| 2014/0281104 A1 | 9/2014 | Raskin | |
| 2015/0143016 A1* | 5/2015 | Egi | G06F 13/404 710/313 |
| 2015/0261434 A1* | 9/2015 | Kagan | G06F 13/28 711/103 |
| 2015/0281126 A1* | 10/2015 | Regula | H04L 67/26 709/212 |
| 2015/0341273 A1* | 11/2015 | Naouri | H04L 47/18 370/231 |

\* cited by examiner

PROVIDING REMOTE, RELIANT AND HIGH PERFORMANCE PCI EXPRESS DEVICE IN CLOUD COMPUTING ENVIRONMENTS

CROSS-REFERENCE TO RELATED APPLICATIONS

This application is a continuation of copending U.S. patent application Ser. No. 14/598,381, filed Jan. 16, 2015, the entire contents and disclosure of which is hereby incorporated herein by reference. This application claims the benefit of U.S. Provisional Patent Application Ser. No. 62/082,909, filed Nov. 21, 2014, the entire content and disclosure of which is hereby incorporated herein by reference.

BACKGROUND

This invention generally relates to providing remote devices in computer systems. More specifically, embodiments of the invention relate to remote PCIe devices in cloud computing environments.

Datacenter and cloud infrastructures are becoming more software defined and programmable with respect to their compute (C), network (N) and storage (S) components. This is largely being driven by virtualization technology, enabling a disaggregation of the computer/network/storage components for a flexible reassembly. Virtualization overhead and management of these disaggregated components becomes a critical component of infrastructure management. While compute and networking virtualization have made great strides integrating new technologies for efficient virtualization, PCIe connected devices, such as accelerators or graphics processing units (GPUs), remain an issue.

Many applications benefit or require direct use of such devices, but the use of virtualization to enhance system utilization often clashes with direct hardware access, especially when virtual machine (VM) migration and/or load balancing and distribution is desired. On the one hand, deploying GPU and/or accelerator inside every single system can be prohibitively expensive and not useful; on the other hand, distributing the computational load while, at the same time, allowing direct access to PCIe devices can be difficult if not impossible under specific service level agreements (SLAs).

SUMMARY

Embodiments of the invention provide a system architecture, a method, and a computer program product for attaching remote physical devices through an existing network fabric providing remote direct memory access (RDMA) services. In one embodiment, the system architecture comprises a compute server and a device server. The compute server includes a compute server system memory, and runs an operating system and one or more remote device drivers; and the device server includes a device server system memory and one or more physical devices, and each of the physical devices includes an associated device memory. The compute server and the device server are connected through the existing network fabric, the device server directly accesses the system memory of the compute server using the RDMA services of the network fabric, and the compute server directly accesses the system memory of the device server using the RDMA services of the network fabric.

In an embodiment, the system architecture further comprises a remote interface (RI) component of the compute server, and a system mapping function. The remote interface component allocates memory space in the system memory of the compute server for each of the physical devices of the device server. The device server allocates memory space in the system memory of the device server for each of the physical devices of the device server. The system mapping function logically connects one or more of the physical devices on the device server to the compute server, including mapping between the system memories and the device memories and keeping the system memories and the device memories in synchronization using the RDMA.

In an embodiment, the system mapping function includes one or more components to shadow and to remap the device memories to main memory copies on the compute server and to keep the device memories and the main memory copies in synchronization using the RDMA, and to shadow and to remap memory buffer spaces on the compute server to copies on the device server and to keep the memory buffer spaces and the copies in synchronization using the RDMA.

In one embodiment, the system mapping function includes a device mapping component on the device server and a client mapping component on the compute server. The device mapping component shadows and remaps each device memory to a main memory copy on the compute server and keeps the each device memory and the main memory copy in synchronization using the RDMA. The client mapping component shadows and remaps each memory buffer space on the compute server to a copy on the device server and keeps the each memory buffer space and the copy in synchronization using the RDMA.

In embodiments, the physical devices on the device server are PCIe devices.

In one embodiment, the system mapping function further includes an interrupt request mapping component for remapping interrupt vector addresses.

In an embodiment, the system architecture further comprises a memory management unit (MMU) based facility on the compute server for detecting and trapping writes inside a shadow MMIO space and io vectors.

In one embodiment, the system architecture further comprises an input output memory management unit (IOMMU) based facility on the device server for detecting and trapping writes inside shadow memory buffers and io vectors.

In embodiments, the compute server runs one or more virtualized operating system images, a remote interface bus driver is instantiated inside one or more of the virtualized operating system images, and RDMA facilities are provided to each of the virtualized operating system images that runs one of the remote interface bus drivers.

In embodiments, the system architecture further comprises one or more additional compute servers; and the physical devices of the remote device server provide multiple virtual functions, and the system mapping function attaches different ones of the virtual functions of each of the physical devices to a same one or to different ones of the compute servers.

In one embodiment, the device server is implemented as a field programmable gate array (FPGA).

Embodiments of the invention provide access to remote high performance PCIe devices, located in another chassis and connected to a remote PCIe bus, by leveraging remote direct memory access (RDMA) mechanisms available in many network technologies, such as Ethernet (ROCE) and Infiniband. The remote chassis can be implemented either as a standard server by a field programmable gate array (FPGA) or ASIC based appliance. In embodiments of the invention, data transfer between the kernel device driver and the physical device is mapped into a set of remote memory access operations that allow for bulk transfer of information and very high flexibility and performance.

Modern, high performance PCIe devices rely on three mechanisms for communicating with the host system:

I/O memory mapped registers (called MMIO address space), that the operating system (OS) can read/write to configure the device and trigger processing functions;

direct memory access (DMA), that the device can use to directly write inside host memory and read from host memory; and interrupts, to inform the host CPU about asynchronous events—on PCIe devices, interrupts always employ message signaled interrupts (MSI).

DETAILED DESCRIPTION

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
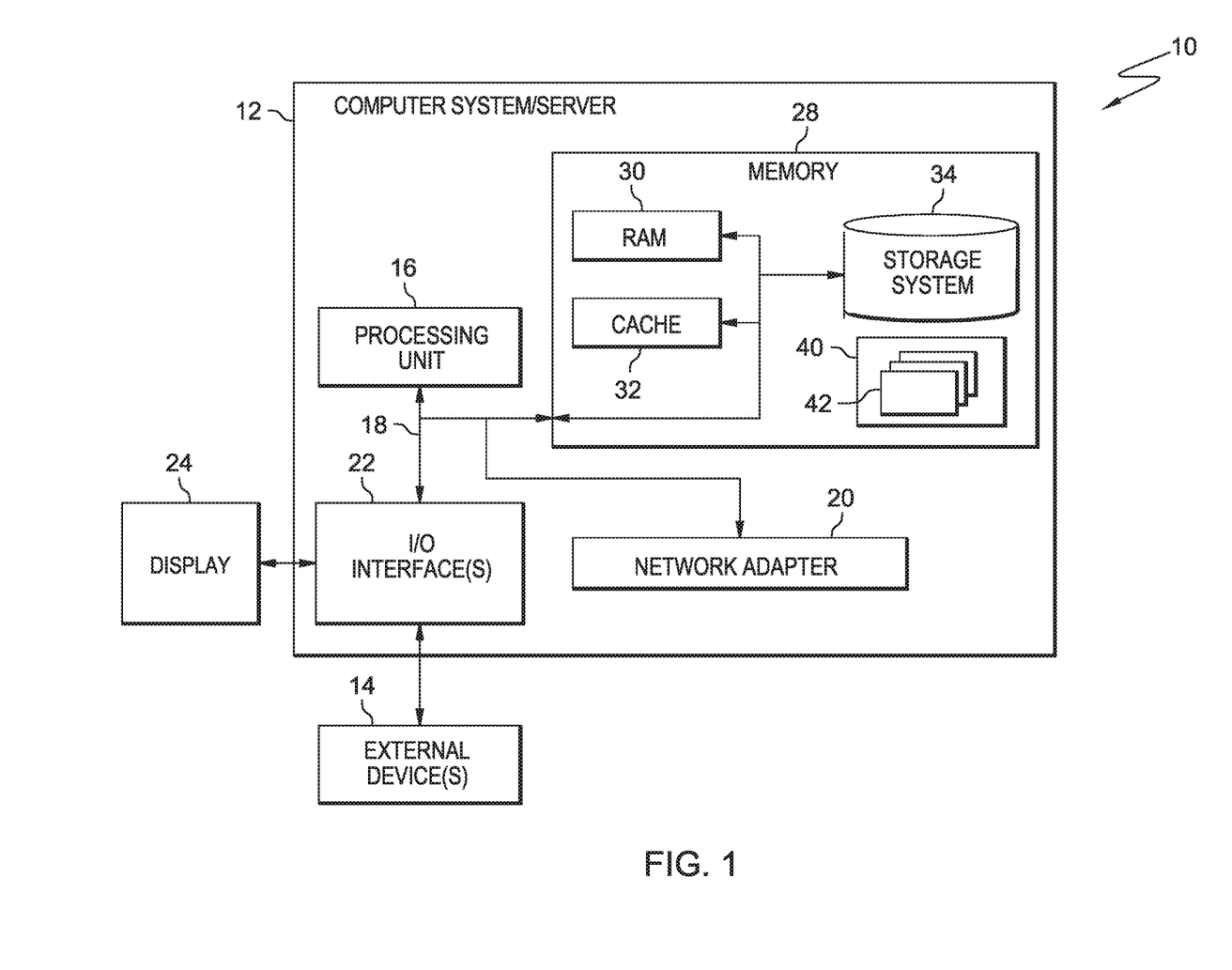
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
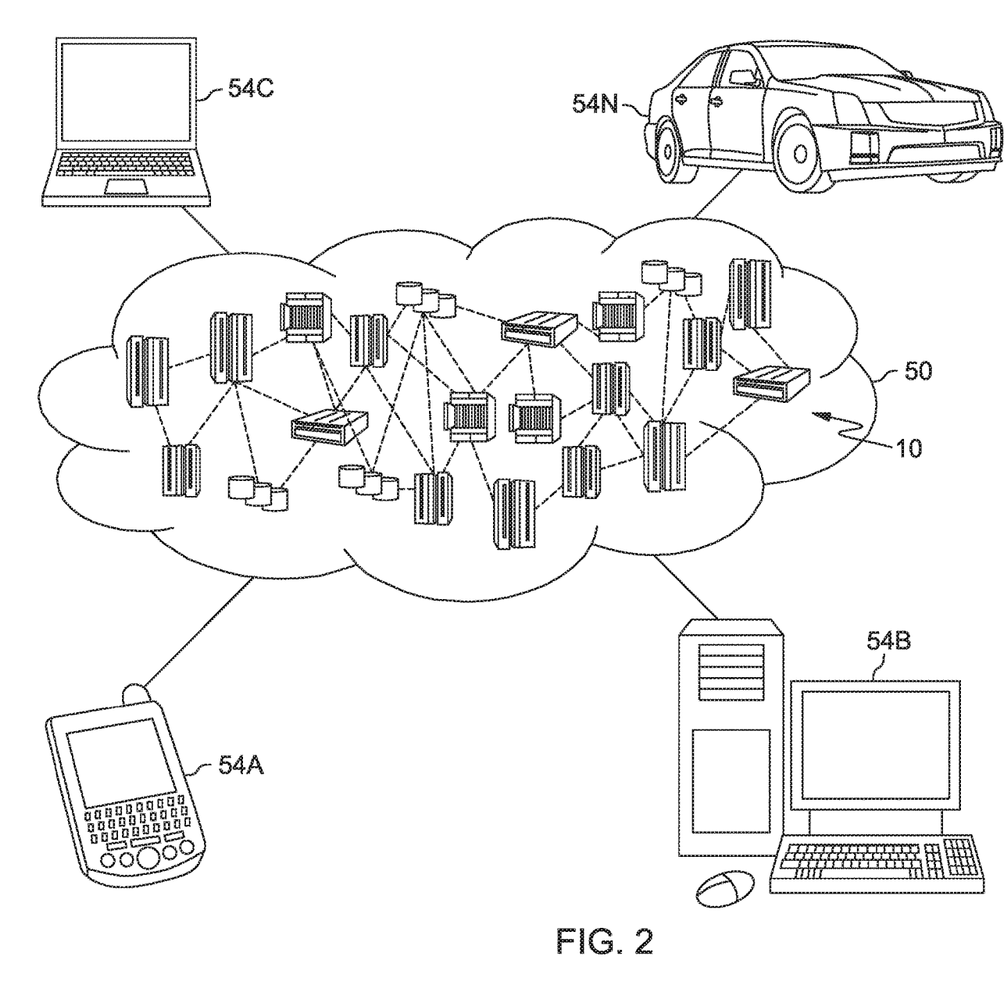
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
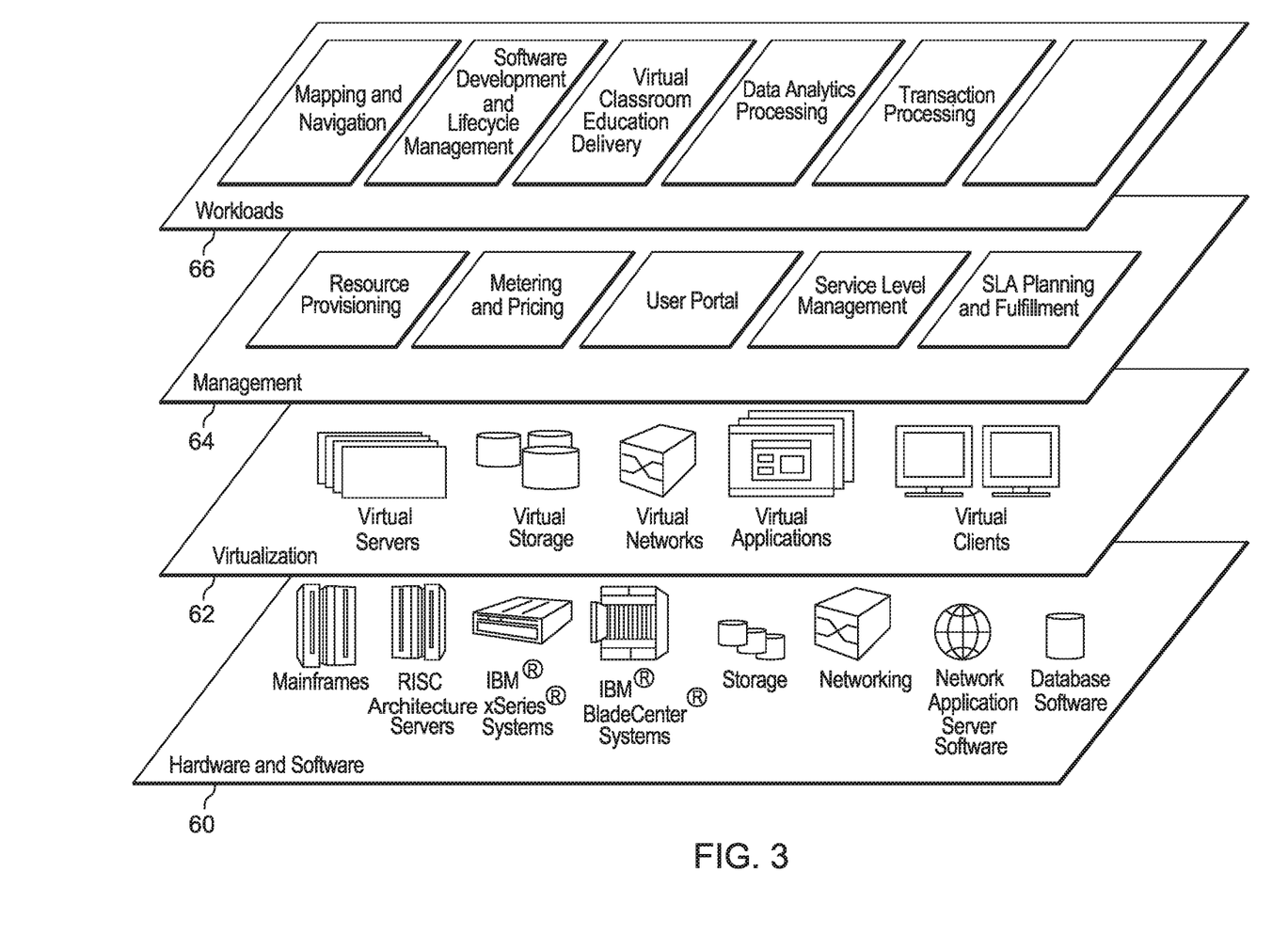
FIG. 3 depicts abstraction model layers according to an embodiment of the present invention.

Referring now to FIG. 3, a set of functional abstraction layers provided by cloud computing environment 50 (FIG.

2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and correlation based adaptive network monitoring.

As discussed above, datacenter and cloud infrastructures are becoming more software defined and programmable with respect to their compute (C), network (N) and storage (S) components. This is largely being driven by virtualization technology, enabling a disaggregation of the compute/network/storage components for a flexible reassembly. Virtualization overhead and management of these disaggregated components becomes a critical component of infrastructure management. While compute and networking virtualization have made great strides integrating new technologies for efficient virtualization, PCIe connected devices, such as accelerators or graphic processing units (GPUs), remain an issue.

Cloud infrastructure and data centers traditionally have been constructed based on clustering general purpose servers. Typically, these servers are rack mounted and contain the necessary components such as CPU, memory, and devices such as HDD, SDD, GPUs, FPGAs, etc. Not all servers necessarily require all device resources. Accordingly, if a workload requires a particular device, it must deploy on a server with that characteristic. In many cases, devices might be under utilized if, for instance, one type of device is required by a workload on a server while other types of devices in that server are not required.

Alternatively, the individual resources themselves can be clustered or pooled and made remotely accessible to the workload. This provides for tighter resource utilization, access to a larger pool of resources, and provides the ability, in case a resource fails in place, to assign an alternate resource of similar type.

What is hence needed is a method to transparently access remote devices over the existing network without requiring additional dedicated PCIe connectivity.

PCIe (Peripheral Component Interconnect Express) is an architecture and related protocol used to interconnect processors and processor clusters with resources, such as process accelerators, memory storage devices, and input/output (I/O) devices. PCIe architecture employs a switch that provides fan-out for an input-output bus. The fan-out capability of the switch facilitates a series of connections for add-in, high performance input-output. PCIe has found applications in servers, storage devices, and other communications systems.

Figure 4:
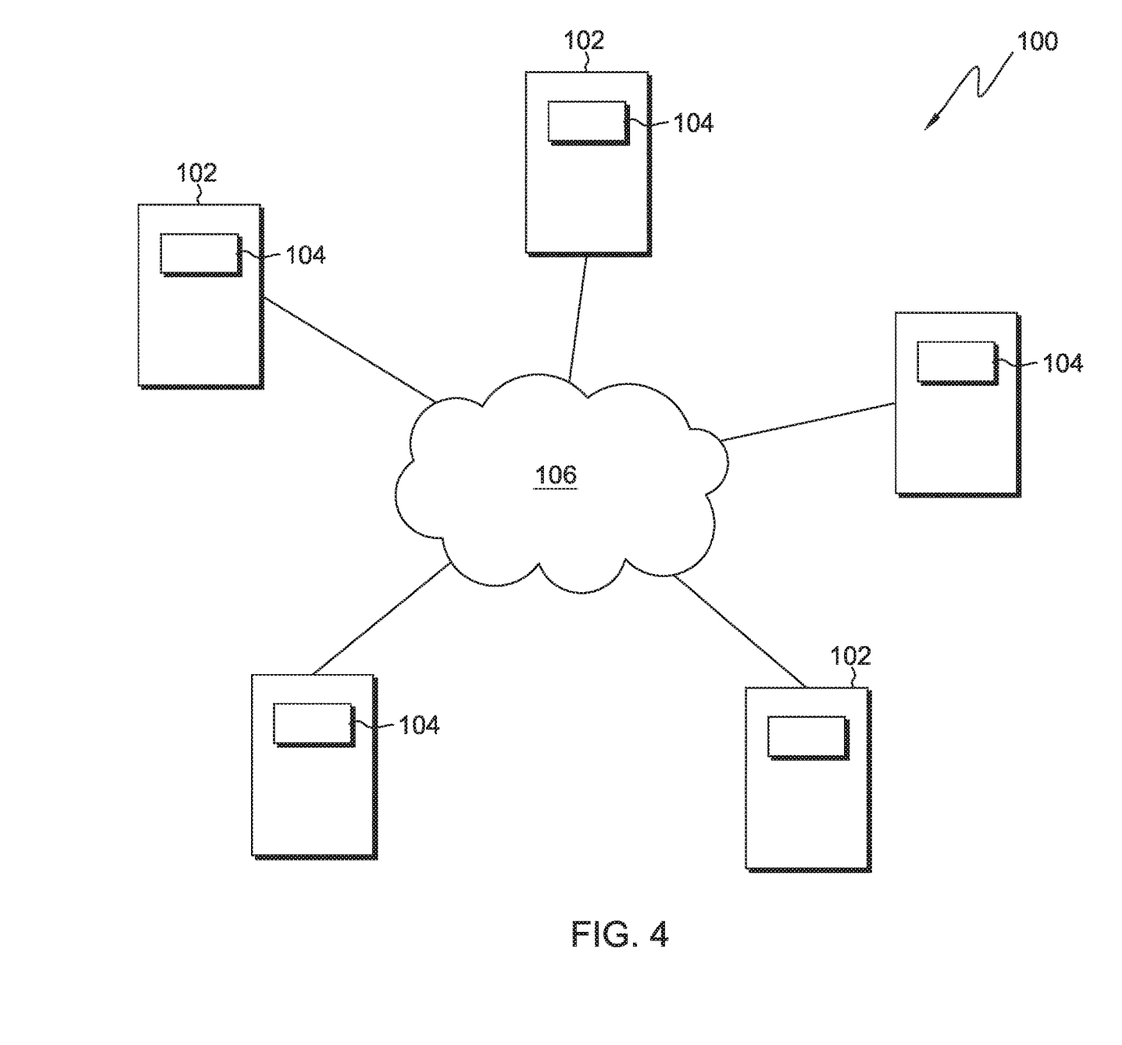
FIG. 4 is a schematic diagram of a system in which embodiments of the invention may be implemented.

FIG. 4 is a schematic diagram of system 100 in which embodiments of the invention may be implemented to provide remote, reliant and high performance PCIe devices in a Cloud computing environment. System 100 may comprise a plurality of servers 102, which may each comprise at least one processor or processor cluster 104. The servers 102 may be interconnected by network 106, which may, for instance, be a local area network, a wide area network or the Internet.

Servers 102 may be configured to host processes, data, and/or respond to user and/or administrator requests. Servers 102 may comprise processor(s) 104, which may execute commands to perform the functions which may be required of the server 102. Processors 104 may use multithreading and/or other technologies to process a plurality of requests substantially simultaneously. Processors 104 may comprise a single processor, a processor cluster, and/or groups of processor clusters. Processors 104 may receive input, process requests, and generate output. In order to perform functions, processors 104 may require access to resources which may transmit data to and from the processor (e.g. I/O), perform part of a process (e.g. process accelerators), and/or store data. Some resources may be located inside a server 102 and may be dedicated for the user of the processors of that server. Other resources may be located in other components (e.g. shared devices) and may be shared by a plurality of processors 104 in a plurality of servers 102.

Processors 104 may transmit resource requests to shared devices. The shared devices may comprise a plurality of resources and may respond to such resource requests. For example, a shared device may comprise process accelerators such as application specific integrated circuits (ASICs), field programmable gate arrays (FPGA), graphics processing units (GPUs), digital signal processors (DSPs), etc. A processor 104 wishing to offload all or part of a particular process may transmit a resource request to a shared device, and the shared device may employ process accelerators to complete the process and transmit resulting data back to the requesting processor 104.

As another example, a shared device may comprise memory storage devices such as cache (e.g. temporary storage) and long term storage (e.g. disk drives, solid state drives, redundant array of independent disks (RAID), etc.). As another example, a shared device may comprise network communication devices such as an Ethernet card, an optical interconnect, an Open Systems Interconnection (OSI) model layer 1 communications device, and/or any other transmitter, receiver, and/or transceiver. A shared device comprising a network communication device may communicate with other components across a transport network and communicate such data to/from the associated processor 104 across the network 106 via a PCIe bus using PCIe protocol.

As discussed above, many computer applications benefit from or require direct use of PCIe connected devices, but the use of virtualization to enhance system utilization often clashes with direct hardware access, especially when virtual machine (VM) migration and/or load balancing and distribution is desired. The most flexible solution requires the ability of separating the "computational" part of the server from the "accelerator and GPU" part and connecting them through a reconfigurable, reliable and scalable mechanism. The PCIe bus, which is used to connect hosts with devices, does not support these kinds of functionalities, however.

Embodiments of the invention provide access to remote high performance PCIe devices, located, for example, in another chassis and connected to a remote PCIe bus, by leveraging remote direct memory access mechanisms available in many network technologies, such as Ethernet (ROCE) and Infiniband. The remote chassis can be implemented either as a standard server or by a field programmable gate array or ASIC based appliance. Data transfer between the kernel device driver and the physical device is mapped into a set of remote memory access operations that allow for bulk transfer of information and very high flexibility and performance.

Figure 5:
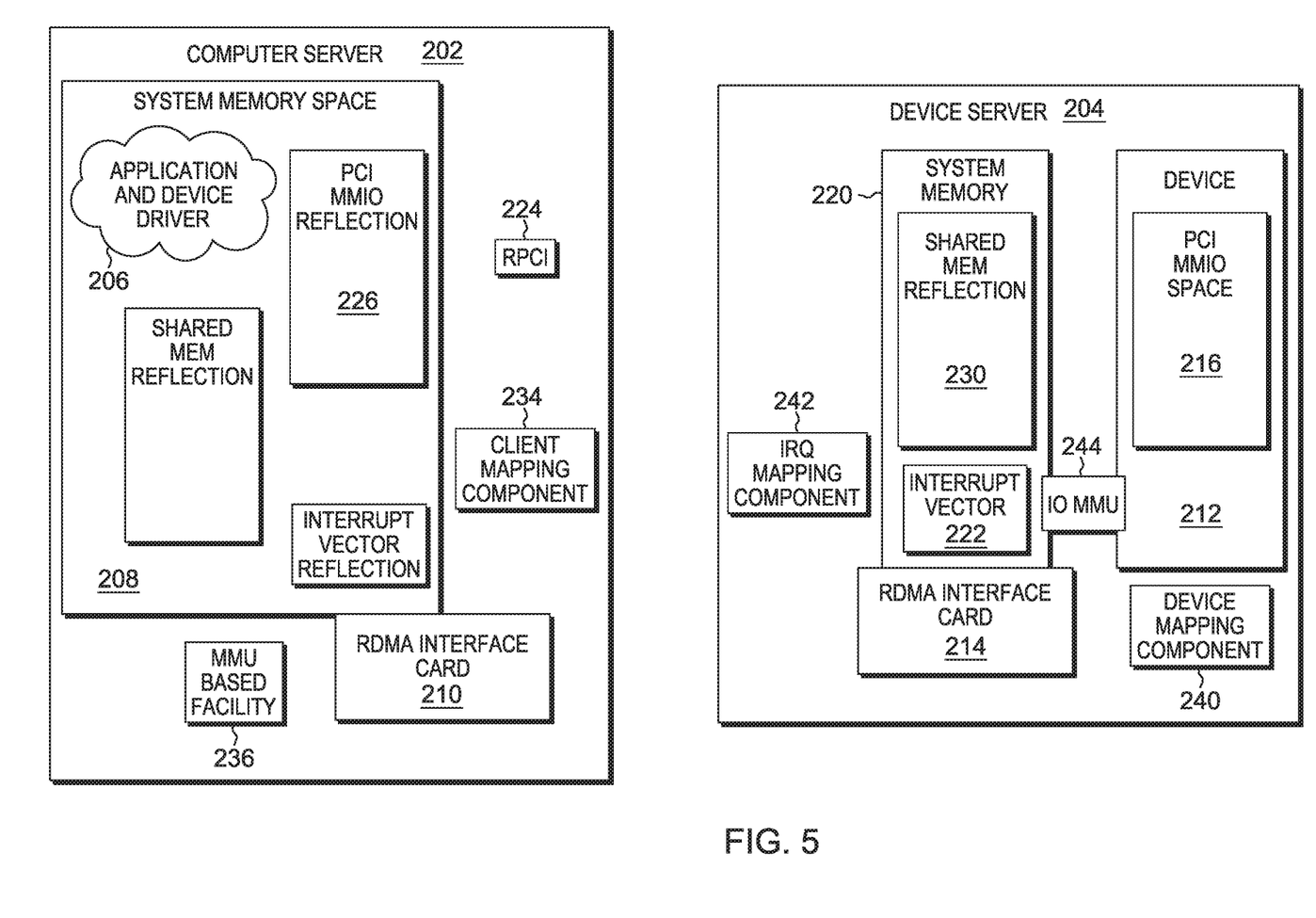
FIG. 5 illustrates an example deployment of server architectures in accordance with an embodiment of the invention.

An example deployment is shown in FIG. 5. In this deployment, there are two servers: a compute server 202, and a device micro server 204. The compute server runs the application and the OS kernel driver 206, and the server has a system memory 208 and an RDMA device 210 (Ethernet or IB or else). The device micro server 204 contains one or more PCIe devices 212 to be accesses through the network, and this server has an RDMA device 214 (Ethernet or IB or else).

Inside the device micro server 204, each PCIe device 212 has an MMIO address space 216 that is discovered and/or configured during boot. Moreover, the device server has an amount of system memory 220 to be used as memory buffers for data transfer to/from the device 212, and has a number of interrupt vectors 222 that can be used to receive interrupt requests (IRQs) from the device 212.

On the compute server 202 side, a component 224 (which can be software or hardware, and referred to as RPCI) simulates a PCIe bus device. When a PCIe discover operation is started on the compute server 202, the RPCI component 224 allocates an in-memory buffer space 226 as large as the physical device MMIO space 216 and informs the remote device server 204 about its addresses to set up RDMA descriptors. There is a one-to-one mapping between the physical MMIO space 216 on the device server 204 side and the logical MMIO reflection space 226 on the compute server 202 side. Due to the MMU and IOMMU, any kind of address translation can be put in place to ensure proper operation.

When the device driver 206 on the compute server 202 allocates and registers IO buffer memory, this operation is transferred by RPCI to the device server 204, where a similar sized memory area 230 is allocated inside main memory 220 and registered (using the same address due to the IOMMU) with the physical device 212. Finally, a similar operation is performed with MSI interrupt vector descriptors.

FIG. 4 also shows a client mapping component 234 and an MMU based facility 236 on the compute server 202, and a device mapping component 240 and an irq mapping component 242 on the device server 204. The client mapping component 234 shadows and remaps the compute server memory buffer space to a copy on the device server and keeps them in synchronization using RDMA. The MMU base facility 236 on the compute server detect (and eventually traps) writes inside the shadow MMIO space and the local memory buffers.

The device mapping component 240 shadows and remaps the PCI MMIO physical address space to a main memory copy on the compute server and keeps them in synchronization using RDMA. The irq mapping component 242 shadows and remaps the interrupt vector addresses and keeps them in synchronization using RDMA. Also, an IOMMU based facility 244 on the device server detects (and eventually traps) writes inside the shadow memory buffers and iovecs.

Runtime device driver operations can be summarized into:
1) Writing in an MMIO register;
2) Reading from an MMIO register;
3) Triggering a DMA operation to transfer data to the device; and
4) Receiving data from the device triggered either by an interrupt or by polling a memory location.

Figure 6:
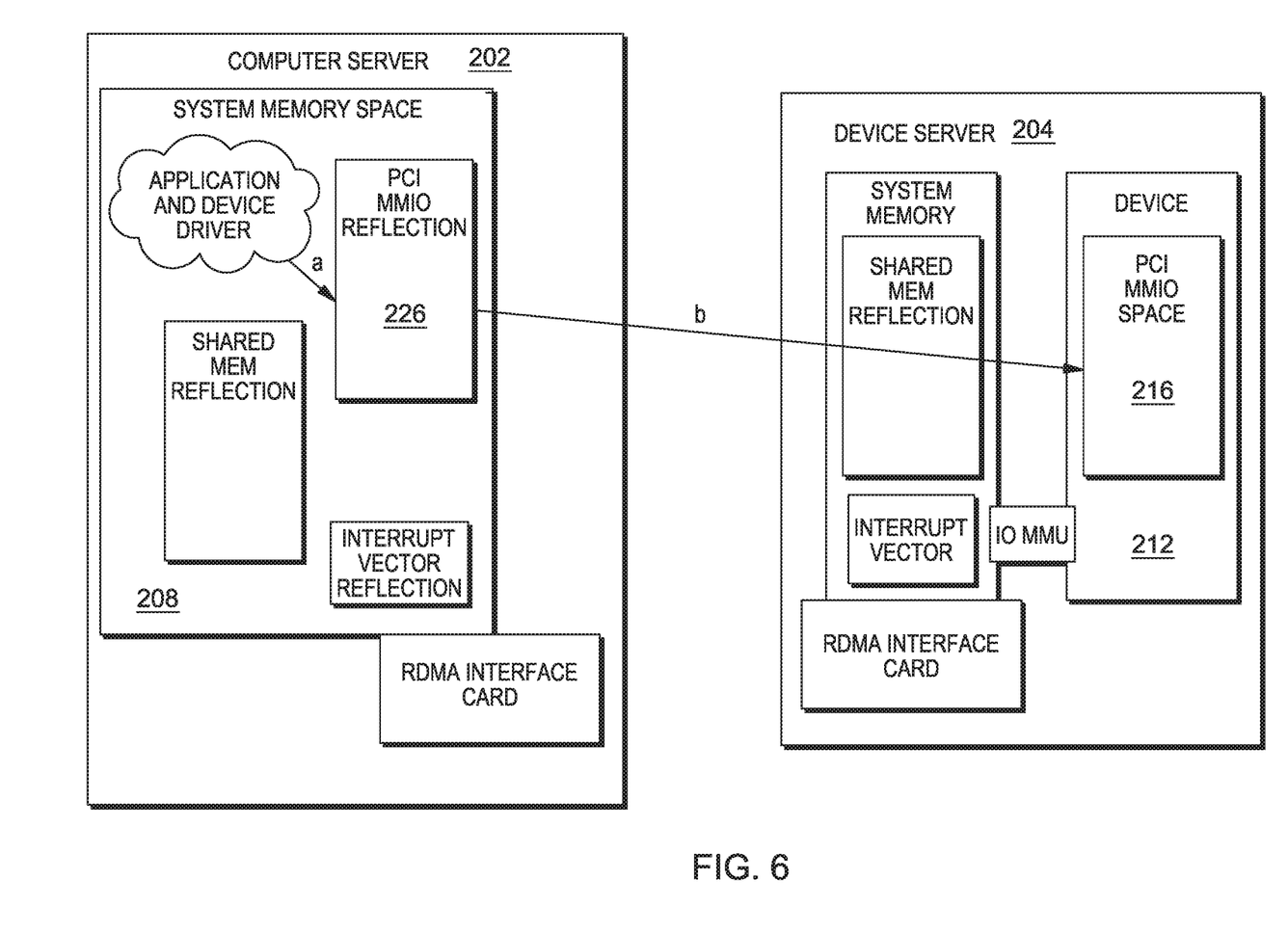
FIG. 6 shows an implementation of a write to an MMIO register of the device server of FIG. 5.

The implementation of the first operation is shown in FIG. 6. In this operation, when the device driver writes inside the PCIe MMIO reflection address space (step a), the CPU MMU will trigger a "fault" and the write is transformed into an RDMA write directly into the remote MMIO address space (step b).

Figure 7:
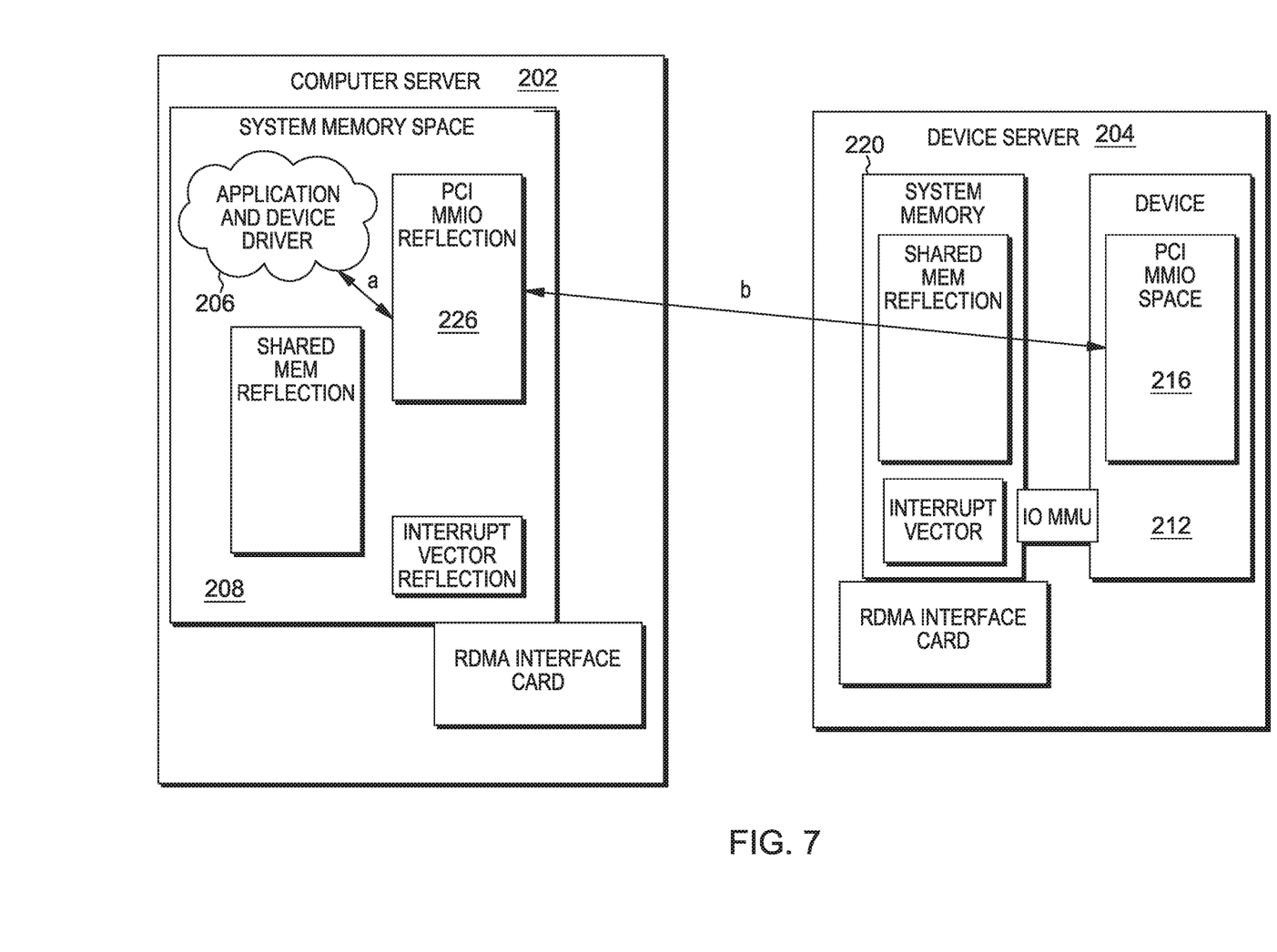
FIG. 7 depicts the implementation of an MMIO read operation in the architecture of FIG. 5.

The implementation of an MMIO read operation is shown in FIG. 7. When the device driver tries to read a location inside the PCI MMIO reflection address space (step a), the CPU MMU will trigger a "fault" and the read is transformed into a RDMA read, which gets the data directly from the remote PCI MMIO address space (step b).

Figure 8:
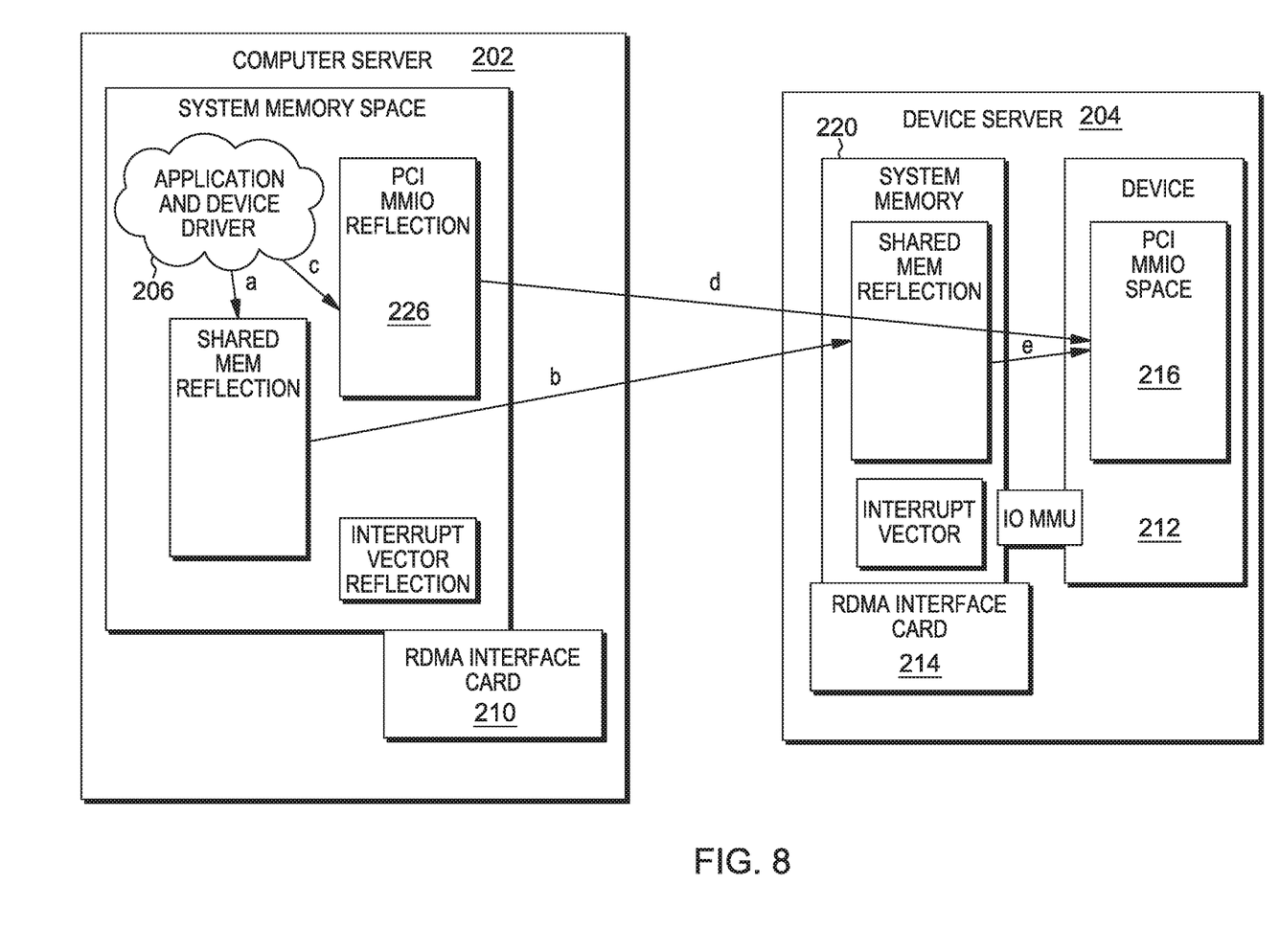
FIG. 8 illustrates the transfer of data to a physical device of the device driver in the architecture of FIG. 5.

To transfer data to the physical device, the device driver performs the operations shown in FIG. 8.

The application and/or device driver (step a) write the data inside memory mapped buffers (previously allocated and registered as IO space). When this happens, the CPU MMU will mark the "dirty" bit on the pages so RPCI knows which blocks should be synchronized with the remote system. The device driver then triggers remote direct memory access (RDMA) transfer by writing a signal in an MMIO mapped mailbox (step c)—this performs exactly the same operation as before—but, before RDMA-ing the MMIO data (step d), the device synchronizes (step b) the shared memory buffer space, clearing the dirty bits as the device performs the synchronization. Once the device server receives the RDMA-ed trigger, the device server can DMA the data from the shared memory buffer copy in the device server (step e).

Figure 9:
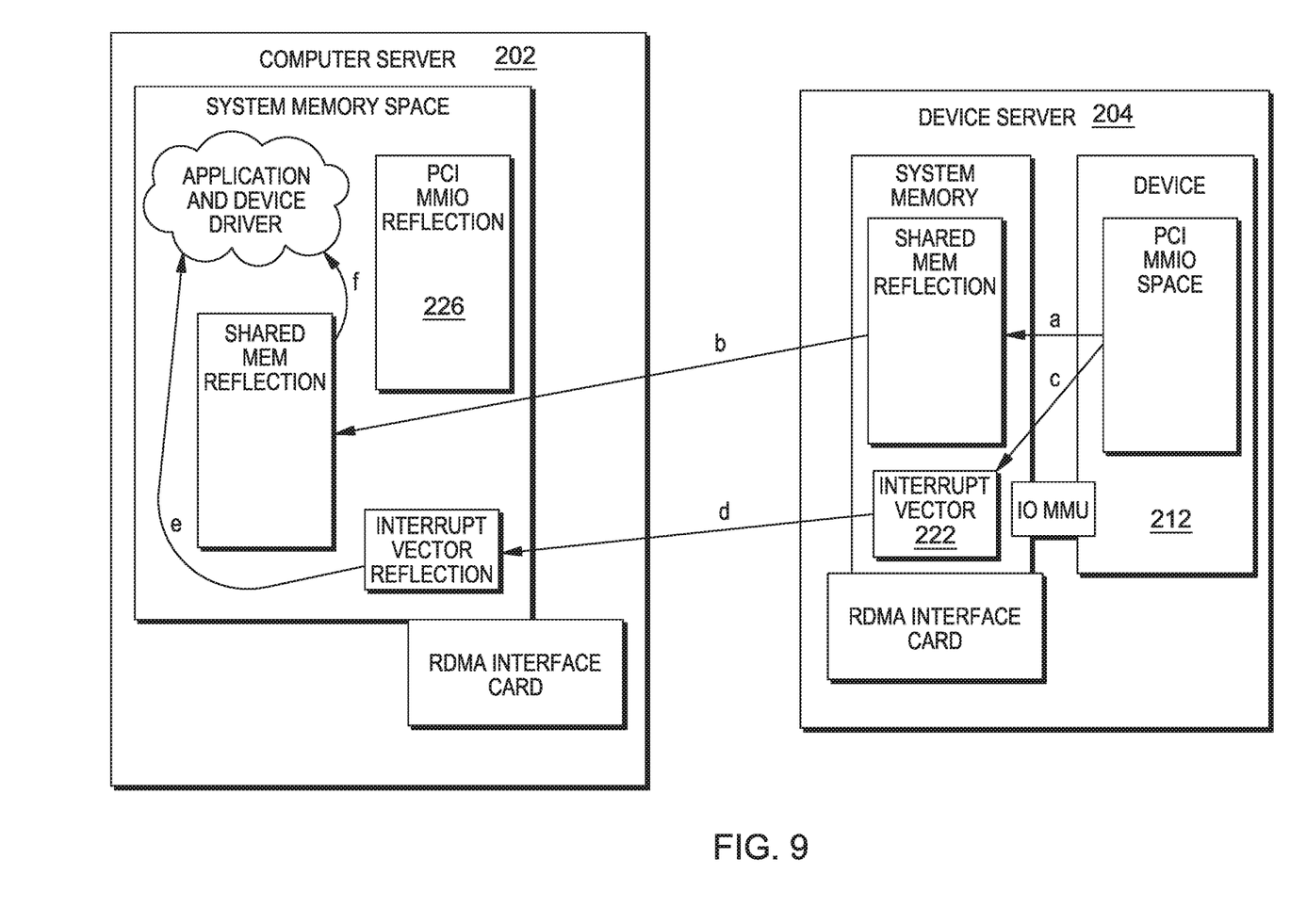
FIG. 9 shows a data transfer from a physical device to a device driver in the architecture of FIG. 5.

The fourth of the above-listed operations is data transfer from the physical device to its device driver. This is shown in FIG. 9 (the IRQ case).

Initially, the device directly writes data in the shared memory buffers on the device server (step a). While this happens, the IOMMU has the opportunity to set "dirty bits"

on the mapped pages. A periodic process (step b) can synchronize the dirty pages with the remote system, writing chunks of data as they come in. Once ready, the physical device triggers an interrupt (step c), writing a vector in a specific location. This write triggers an interrupt in the device server, which has the opportunity to finish synchronizing the shared memory buffer and to RDMA the interrupt vector (step d) directly inside the remote interrupt vector in the compute server. This triggers (step e) an interrupt with the device driver which can then read (step f) the incoming data.

To provide a high availability solution, more than one device server with identical physical devices may be connected to a compute server. MMIO and shared memory synchronization is done to both device servers in parallel (flow: compute server->device server). The IRQ and DMA back to the compute server (flow: device server->compute server) only needs to be done by one of the device servers. In case of failure of one of the device servers, the second device server will take over (referred to as hot standby).

The invention claimed is:

1. A method for attaching remote physical devices of a device server to a compute server through an existing network fabric providing remote direct memory access (RDMA) services, the compute server including a compute server system memory, and running an operating system and one or more remote device drivers; the device server including a device server system memory and one or more physical devices, each of the physical devices including an associated device memory;

and wherein the compute server and the device server are connected through the existing network fabric, the device server directly accesses the system memory of the compute server using the RDMA services of the network fabric, and the compute server directly accesses the system memory of the device server using the RDMA services of the network fabric, the method comprising:

allocating memory space in the system memory of the compute server as memory buffer space on the compute server for data transfers to and from each of the physical devices of the device server, and wherein the device server allocates memory space in the system memory of the device server for data transfers to and from each of the physical devices of the device server; and logically connecting one or more of the physical devices on the device server to the compute server, including mapping the device memory associated with each of the physical devices to a copy of the associated device memory in the memory space allocated in the system memory of the compute server for said each physical device, and mapping each of the memory buffer spaces on the compute server to a copy of said each memory buffer space on the device server; and transferring data from the compute server to one of the physical devices, including the compute server writing the data inside the memory buffer space of the compute server allocated for said one of the physical devices, and triggering an RDMA transfer of the data to the device server, and the device server receiving the data, by the triggered RDMA transfer, from said allocated memory buffer space of the compute server.

2. The method according to claim 1, wherein the triggering an RDMA transfer includes the compute server writing a signal in a memory mapped register on the compute server.

3. The method according to claim 2, wherein the transferring data from the compute server to the one of the physical devices further includes the compute server synchronizing the data in a shared memory space on the device server.

4. The method according to claim 3, wherein the device server receiving the data includes the device server accessing the data from the shared memory space on the device server.

5. The method according to claim 4, wherein the synchronizing the data in a shared memory space on the device server includes synchronizing the data in the shared memory space on the device server before the device server accessing the data from the shared memory space on the device server.

6. The method according to claim 1, wherein the mapping the device memory associated with each of the physical devices to a copy of the associated device memory in the memory space allocated in the system memory of the compute server for said each physical device includes shadowing and remapping the memories associated with the physical devices to the copies of the associated device memories on the compute server.

7. The method according to claim 6, wherein the shadowing and remapping the memories associated with the physical devices to the copies of the associated device memories on the compute server includes using a device mapping component on the device server to shadow and remap the memories associated with the physical devices to the copies of the associated device memories on the compute server.

8. The method according to claim 1, wherein the mapping each of the memory buffer spaces on the compute server to a copy of said each memory buffer space on the device server includes shadowing and remapping the memory buffer spaces on the compute server to the copies thereof on the device server.

9. The method according to claim 8, wherein the shadowing and remapping the memory buffer spaces on the compute server to copies thereon on the device server includes using a client mapping component on the compute server to shadow and remap the memory buffer spaces on the compute server to the copies thereof on the device server.

10. The method according to claim 1, wherein the logically connecting one or more of the physical devices on the device server to the compute server further includes remapping interrupt vector addresses.

11. A system architecture for attaching remote physical devices through an existing network fabric providing remote direct memory access (RDMA) services, the system architecture comprising:

a compute server including a compute server system memory, and running an operating system and one or more remote device drivers;

a device server including a device server system memory and one or more physical devices, each of the physical devices including an associated device memory; and wherein the compute server and the device server are connected through the existing network fabric, the device server directly accesses the system memory of the compute server using the RDMA services of the network fabric, and the compute server directly accesses the system memory of the device server using the RDMA services of the network fabric;

a remote interface (RI) component of the compute server to allocate memory space in the system memory of the compute server as memory buffer space on the compute server for data transfers to and from each of the physical devices of the device server, and wherein the device server allocates memory space in the system memory of the device server for data transfers to and from each of the physical devices of the device server; and a system mapping function to logically connect one or more of the physical devices on the device server to the compute server, including mapping the device memory associated with each of the physical devices to a copy of the associated device memory in the memory space allocated in the system memory of the compute server for said each physical device, and mapping each of the memory buffer spaces on the compute server to a copy of said each memory buffer space on the device server; and wherein the compute server transfers data to one of the physical devices, including the compute server writing the data inside the memory buffer space of the compute server allocated for said one of the physical devices, and triggering an RDMA transfer of the data to the device server, and the device server receives the data, by the triggered RDMA transfer, from said allocated memory space of the compute server.

12. The system architecture according to claim 11, wherein triggering an RDMA transfer includes the compute server writing a signal in a memory mapped register on the compute server.

13. The system architecture according to claim 12, wherein transferring data from the compute server to the one of the physical devices further includes the compute server synchronizing the data in a shared memory space on the device server.

14. The system architecture according to claim 13, wherein the device server receiving the data includes the device server accessing the data from the shared memory space on the device server.

15. The system architecture according to claim 14, wherein the synchronizing the data in a shared memory space on the device server includes synchronizing the data in the shared memory space on the device server before the device server accessing the data from the shared memory space on the device server.

16. A computer program product for attaching remote physical devices of a device server to a compute server through an existing network fabric providing remote direct memory access (RDMA) services, the compute server including a compute server system memory, and running an operating system and one or more remote device drivers; the device server including a device server system memory and one or more physical devices, each of the physical devices including an associated device memory; and wherein the compute server and the device server are connected through the existing network fabric, the device server directly accesses the system memory of the compute server using the RDMA services of the network fabric, and the compute server directly accesses the system memory of the device server using the RDMA services of the network fabric, the computer program product comprising a non-transitory computer readable storage medium having program instructions embodied therewith, the program instructions executable by a processor to cause the processor to:

allocate, by the processor, memory space in the system memory of the compute server as memory buffer space on the compute server for data transfers to and from each of the physical devices of the device server, and wherein the device server allocates memory space in the system memory of the device server for data transfers to and from each of the physical devices of the device server; and logically connect, by the processor, one or more of the physical devices on the device server to the compute server, including mapping the device memory associated with each of the physical devices to a copy of the associated device memory in the memory space allocated in the system memory of the compute server for said each physical device, and mapping each of the memory buffer spaces on the compute server to a copy of said each memory buffer space on the device server; and transfer, by the processor, data from the compute server to one of the physical devices, including the compute server writing the data inside the memory buffer space of the compute server allocated for said one of the physical devices, and triggering an RDMA transfer of the data to the device server, and the device server receiving the data, by the triggered RDMA transfer, from said allocated memory space of the compute server.

17. The computer program product according to claim 16, wherein the triggering an RDMA transfer includes the compute server writing a signal in a memory mapped register on the compute server.

18. The computer program product according to claim 17, wherein transferring data from the compute server to the one of the physical devices further includes the compute server synchronizing the data in a shared memory space on the device server.

19. The computer program product according to claim 18, wherein the device server receiving the data includes the device server accessing the data from the shared memory space on the device server.

20. The computer program product according to claim 19, wherein the synchronizing the data in a shared memory space on the device server includes synchronizing the data in the shared memory space on the device server before the device server accessing the data from the shared memory space on the device server.

* * * * *